(12) United States Patent
Kojima

(10) Patent No.: US 6,802,069 B1
(45) Date of Patent: Oct. 5, 2004

(54) DEVICE FOR RECORDING OR REPRODUCING SIGNALS ON DISK AND METHOD OF INSERTING AND EXTRACTING CARTRIDGE FOR THE DEVICE

(75) Inventor: Yasushi Kojima, Nishinomiya (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/926,159

(22) PCT Filed: Mar. 21, 2000

(86) PCT No.: PCT/JP00/01723

§ 371 (c)(1),
(2), (4) Date: Sep. 14, 2001

(87) PCT Pub. No.: WO00/57415

PCT Pub. Date: Sep. 28, 2000

(30) Foreign Application Priority Data

Mar. 19, 1999 (JP) .............................. 11/74770

(51) Int. Cl.[7] .............................................. G11B 17/03
(52) U.S. Cl. ...................................................... 720/613
(58) Field of Search ...................... 369/77.2; 360/99.01, 360/99.02, 99.06, 133, 99.12, 99.05

(56) References Cited

U.S. PATENT DOCUMENTS

| | | | | |
|---|---|---|---|---|
| 4,949,205 A | * | 8/1990 | Tezuka ..................... | 360/99.05 |
| 5,625,612 A | * | 4/1997 | Tozune et al. ............. | 369/77.2 |
| 5,650,891 A | * | 7/1997 | Thayne et al. ........... | 360/99.06 |
| 6,125,012 A | * | 9/2000 | Miyazaki et al. ........... | 360/133 |
| 6,344,945 B1 | * | 2/2002 | Ariyoshi ................... | 360/99.06 |
| 6,388,835 B1 | * | 5/2002 | Ariyoshi ................... | 360/99.12 |

FOREIGN PATENT DOCUMENTS

| | | |
|---|---|---|
| JP | 5-334785 | 12/1993 |
| JP | 7-85560 | 3/1995 |

* cited by examiner

*Primary Examiner*—Tianjie Chen
(74) *Attorney, Agent, or Firm*—Armstrong, Kratz, Quintos, Hanson & Brooks, LLP

(57) ABSTRACT

A holder pivotally supported on a chassis for supporting a cartridge which is provided with a shutter biased by a spring in a closing direction. A slide member mounted on the holder is reciprocatingly movable between a first position where an opening piece pushes the shutter open with the loading of the cartridge into the holder and a second position where the latch engages the cartridge after moving from the first position toward the cartridge loading direction. A release mechanism is disposed between the chassis and the holder for disengaging the latch from the cartridge when the cartridge is unloaded from the holder. The cartridge as disengaged and in contact with the opening piece is moved by the spring in the unloading direction.

1 Claim, 10 Drawing Sheets

DEVICE FOR RECORDING OR REPRODUCING SIGNALS ON DISK AND METHOD OF INSERTING AND EXTRACTING CARTRIDGE FOR THE DEVICE

BACKGROUND OF THE INVENTION

1. Field of the Invention

The present invention relates to recording or playback devices for disks accommodated in cartridges, and to a method of loading the cartridge into the device and unloading the cartridge therefrom.

2. Description of the Related Art

FIG. 9 is a perspective view of a cartridge 60 having a disk 6 accommodated therein [see JP-B No. 7-36261 (1995)]. The cartridge 60 is provided in one side portion thereof with a groove 62, with a shutter 61 fitted thereover. The cartridge 60 has an upper surface marked with an arrow 63 indicating the direction in which the cartridge 60 is to be loaded into the recording or playback device. With reference to FIG. 9, the shutter 61 is held closed by a lock claw (not shown) within the cartridge 60.

While the shutter 61 is opened, the disk 6 is partly exposed from the cartridge 60. When the cartridge 60 is loaded into the recording or playback device with the arrow mark 63 directed toward the device, an opening piece 31 provided inside the device advances into the groove 62, releasing the lock claw from the shutter 61 to open the shutter 61.

A holder 2 for holding the cartridge 60 therein is pivotally supported on a chassis 1 as at 25 upwardly or downwardly movably. FIG. 10 is a side elevation showing a conventional disk recording or playback device, and FIGS. 11A and 11B are views in section of the device as it is seen from the direction B. Provided on a support plate 20 projecting outward from the holder 2 is a kickout member 5 which is slidable along the cartridge loading and unloading directions. The kickout member 5 has a contact piece 50 projecting therefrom into a path of movement of the cartridge 60 and pushable by the front end of the cartridge 60. The kickout member 5 is biased in the cartridge unloading direction by a spring 8 extending between this member and the holder 2. The opening piece 31 is provided inside the holder 2. In the following description, the cartridge loading direction will be referred to as forward.

The cartridge 60 is loaded into the holder 2 in the state shown in FIG. 11A while pushing the kickout member 5 against the spring 8 on the member 5. The opening piece 31 comes into contact with the front edge of the shutter 61, opening the shutter 61 with the loading of the cartridge 60. When the shutter 61 is completely opened, the kickout member 5 is engaged with the holder 2 by a latch mechanism (not shown), holding the cartridge 60 loaded in the holder as seen in FIG. 11B.

When the kickout member 5 is released from the holder 2, the contact piece 50 pushes the cartridge 60 in the direction of unloading the cartridge from the holder 2 by being biased by the spring 8 on the kickout member 5.

However, if the inside lock claw is released to inadvertently open the shutter 61 while the cartridge 60 shown in FIG. 9 is not in use, the shutter 61 is unable to close automatically and therefore remains open. Consequently, dust in the atmosphere is liable to adhere to the disk 6, causing problems during recording or playback.

In view of this problem, the present applicant proposed a cartridge 60 wherein a torsion spring 66 is provided between the shutter 61 and the cartridge 60 for automatically closing the shutter 61 as shown in FIG. 3. The applicant conceived the idea that if the cartridge 60 is unloaded with use of the biasing force of the torsion spring 66 of the proposed cartridge 60, this eliminates the need to provide the separate member for kicking out the cartridge 60 from the holder 2, whereby the cartridge unloading mechanism can be simplified.

An object of the present invention is to provide a simplified cartridge unloading mechanism for use in recording or playback devices adapted for use with cartridges having a shutter biased in the closing direction, the mechanism further being adapted to close the shutter reliably.

SUMMARY OF THE INVENTION

The present invention provides a device which is adapted for use with a cartridge 60 having a disk 6 accommodated therein and a shutter 61 biased in a closing direction at all times by a spring 66 disposed inside the cartridge and wherein a holder 2 is provided with a latch 30 movable in a cartridge loading direction for holding the cartridge 60 in a completely loaded position by light engagement therewith.

The cartridge is loaded by the steps of:

inserting the cartridge 60 into the holder 2 and causing an opening piece 31 to open the shutter 61 against the force of the spring 66 inside the cartridge 60, further inserting the cartridge 60 into the holder 2 along with the opening piece 31 with the shutter 61 completely opened, and holding the cartridge 60 in the holder 2 by causing the latch 30 to engage the cartridge 60.

The cartridge is unloaded by the steps of:

disengaging the latch 30 from the cartridge 60, and causing the force of the spring 66 to move the shutter 61, which is completely opened in contact with the opening piece 31, in a direction of unloading the cartridge 60 from the holder 2 and closing the shutter 61 by the force of the spring 66.

DETAILED DESCRIPTION OF THE PREFERRED EMBODIMENT

An embodiment of the invention will be described below in detail.

Brief Description of Cartridge

Figure 3:
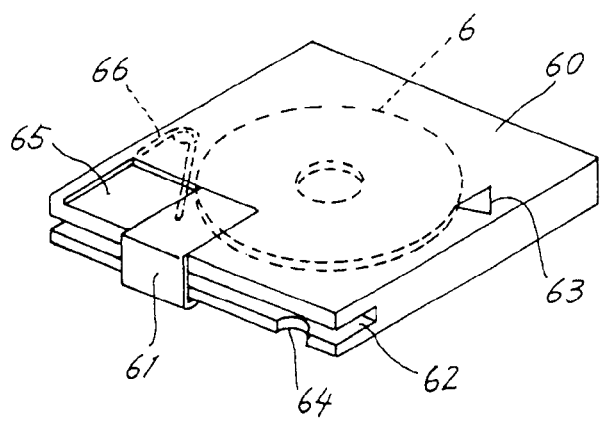
FIG. 3 is a perspective view of a cartridge proposed by the present applicant.

FIG. 3 is a perspective view showing a cartridge 60 (not disclosed) prepared by the present applicant. The cartridge 60 has a groove 62 in one side portion thereof and a recessed portion 65 in its upper surface. A shutter 61 is slidably disposed in the recessed portion 65 and fitted over the groove 62. The shutter 61 is biased in a closing direction by a torsion spring 66 inside the cartridge 60. Even if inadvertently opens, the shutter 61 is closed automatically. A caved portion 64 is formed in the bottom wall of the cartridge 60. A slide member 3 is engageable in the caved portion 64 as will be described later. While the shutter 61 is in an opened state, a disk 6 within the cartridge 60 is partly exposed for recording or reproducing signals.

Overall Construction

Figure 1:
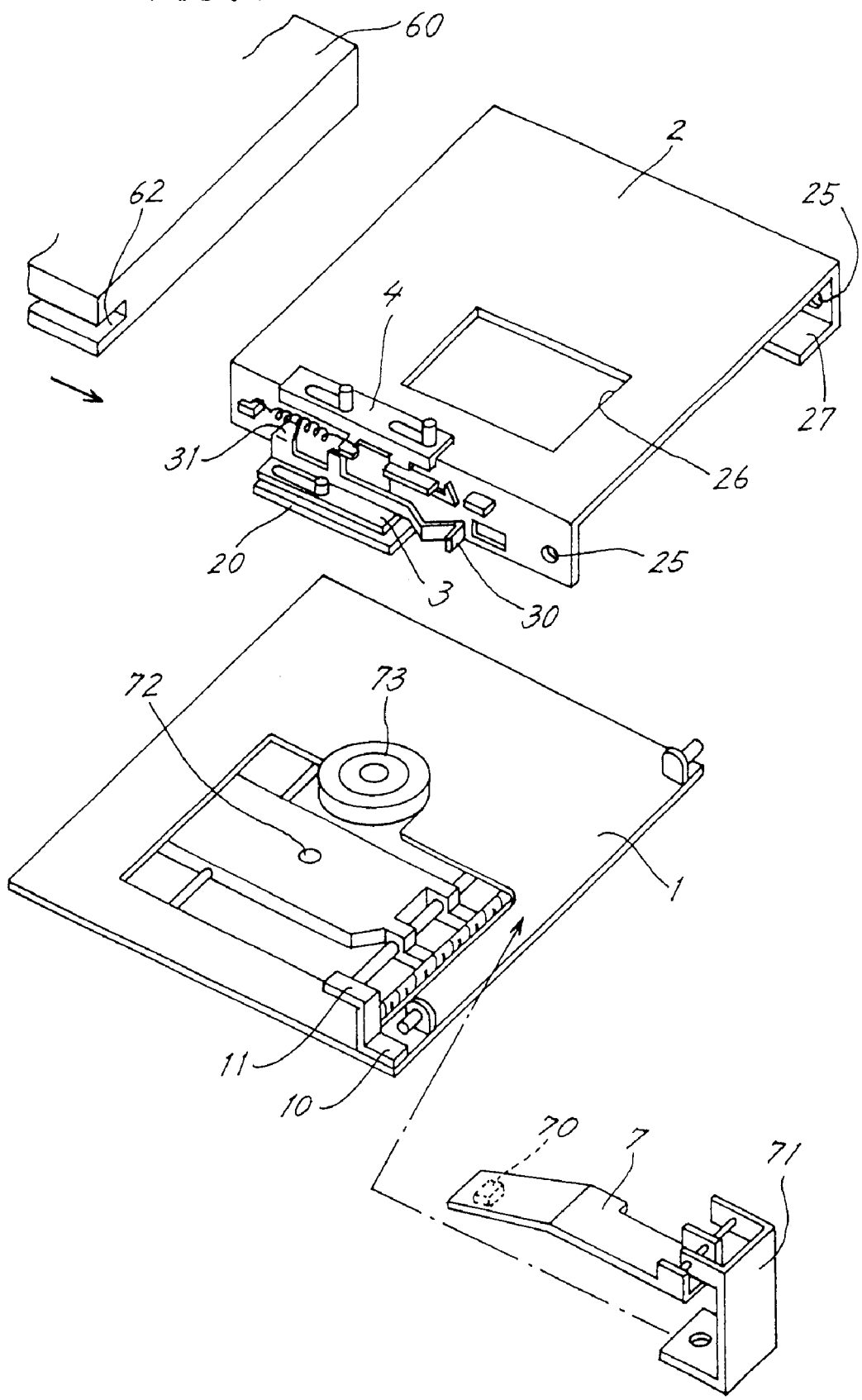
FIG. 1 is an exploded perspective view of a disk recording or playback device of the invention.

FIG. 1 is an exploded perspective view of a disk recording or playback device. A holder 2 is pivoted at one end thereof to a chassis 1 provided with a pickup 72, and the cartridge 60 is inserted into the holder 2. The pickup 72 is movable toward or away from a turntable 73. A bracket 71 is attached to the bottom face of the pickup 72. A head lever 7 provided with a recording head 70 at an outer end thereof is pivoted at a base end thereof to the bracket 71. The head lever 7 is advanced by a lift mechanism (not shown) into the holder 2 through an opening 26 formed in an upper wall of the holder 2. The disk 6 in the cartridge 60 is accessible by the recording head 70 for signal recording as in the prior art.

A change-over piece 10 formed by bending a metal plate and having a projecting upper plate 11 is provided at one corner of the front end of the chassis 1.

A receiving plate 27 extends inward from the lower end of side plate of the holder 2. The cartridge 60 is supported at its bottom on the receiving plate 27. A support plate 20 extends outward from the lower end of one side portion of the holder 2. A slide member 3 is slidably supported by the support plate 20.

Figure 2:
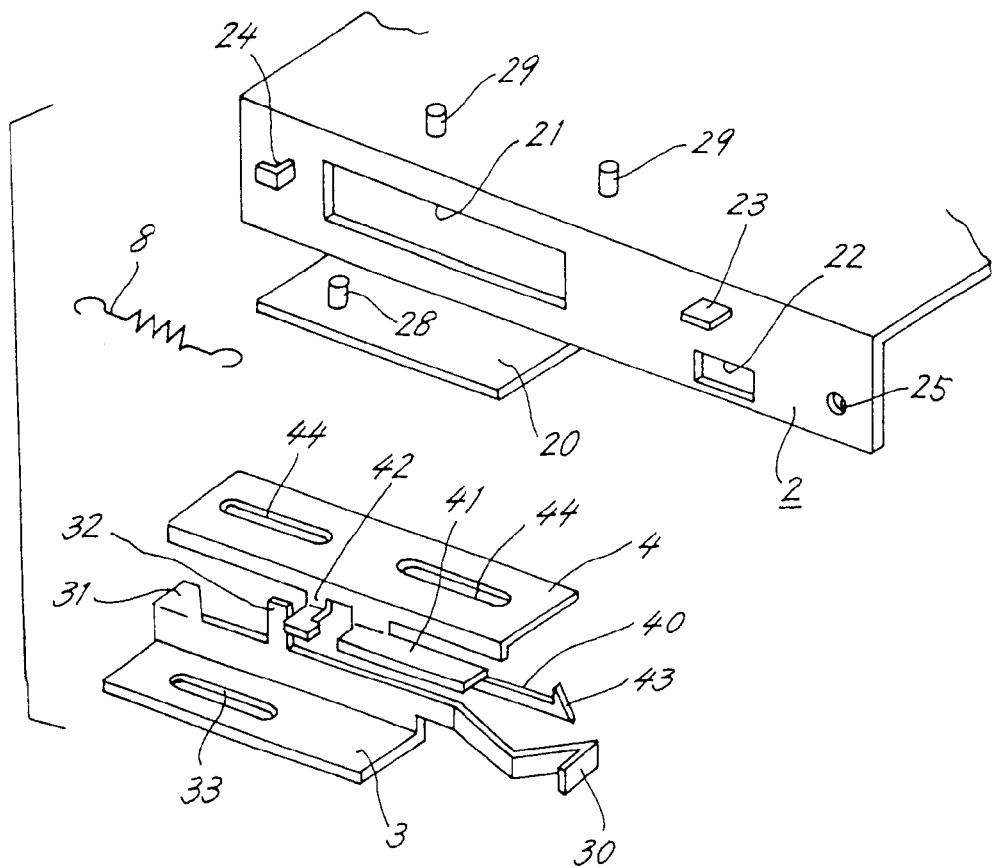
FIG. 2 is an exploded perspective view of a holder and a slide member.

FIG. 2 is an exploded perspective view of the holder 2 and the slide member 3. A pin 28 projecting from the support plate 20 is fitted in a slit 33 of the slide member 3 to render the slide member 3 movable in cartridge loading and unloading directions. A lock slide 4 is disposed above the slide member 3. Pins 29, 29 projecting from the upper wall of the holder 2 are fitted in respective slits 44, 44 in the lock slide 4, rendering the lock slide 4 movable in the cartridge loading and unloading directions.

The slide member 3 is formed by bending a metal plate and integrally has an opening piece 31 projecting inward from the rear end thereof, a projection 32 extending upward from the approximate midportion of its length, and a latch 30 positioned at the front end of the member 3 and having an inwardly projecting forward end. The opening piece 31 advances into the holder 2 through an aperture 21 formed in the holder 2 to come into contact with an end face of the shutter 61.

The lock slide 4 is formed by bending a metal plate and integrally has an engaging hook 40 extending forward from the lengthwise midportion of side wall thereof toward a front end, and a spring retainer 42 projecting outward from the approximate midportion of length of its side wall. The engaging hook 40 is elastically deformable downward and has a slope 43 at its front end. A push plate 41 extends outward approximately from the base end of the latch 30. The change-over piece 10 (see FIG. 1) has slightly higher rigidity than the engaging hook 40.

The holder 2 has formed therein the aperture 21 for the opening piece 31 to move in, and a hole 22 positioned forwardly of the aperture 21. The latch 30 fits into the hole 22, with the cartridge 60 completely loaded in the holder 2. Projecting outward from the holder above the hole 22 is a lug 23 with which the engaging hook 40 of the lock slide 4 is engageable.

A hook 24 is provided on the holder 2 at a rear end portion thereof. A tension spring 8 engaged with the hook 24 and the spring retainer 42 on the lock slide 4 biases the lock slide 4 rearward. The contact of the front edge of each slit portion 44 with the pin 29 restrains the lock slide 4 from moving further rearward. The lock slide 4 biases the slide member 3 rearward by virtue of the contact of the projection 32 of the slide member 3 with the rear side of the spring retainer 42. The biasing force of the tension spring 8 is made greater than the shutter biasing force of the torsion spring 66 inside the cartridge 60.

The cartridge 60 is loaded into the holder 2 as pivotally moved upward. Signals are recorded or reproduced when the cartridge 60 is positioned as opposed to the chassis 1 by the holder 2 pivotally moved downward. For the convenience of description, the head lever 7 will not be described below.

Figure 4A:
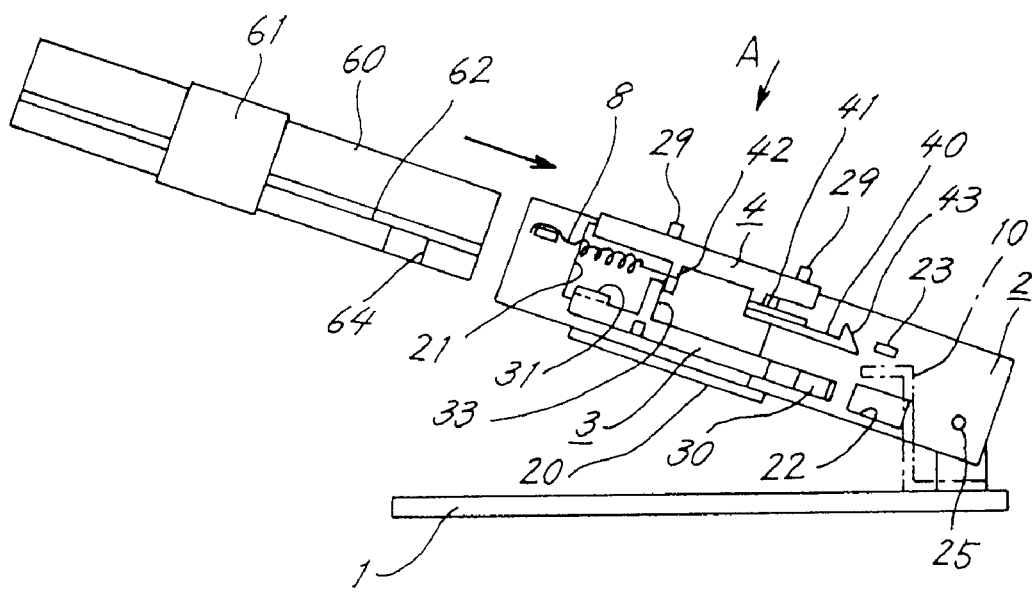
FIG. 4A, FIG. 4B are side elevations of the holder in a raised position, FIG. 4A showing the holder ready for the loading of the cartridge, FIG. 4B showing the cartridge as loaded completely.
Figure 4B:
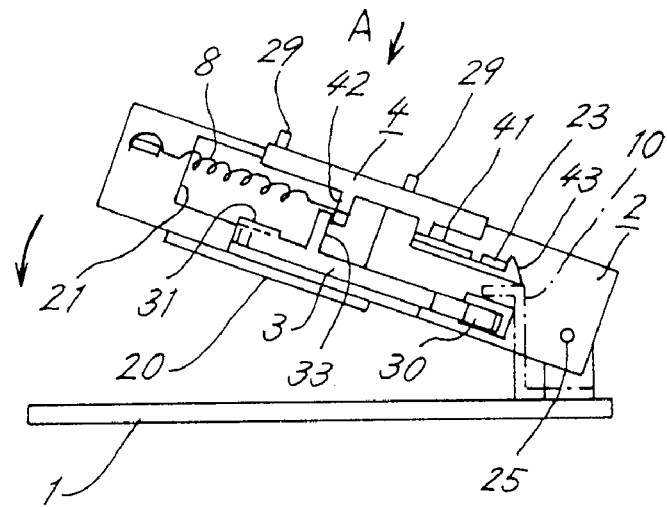
Figure 5A:
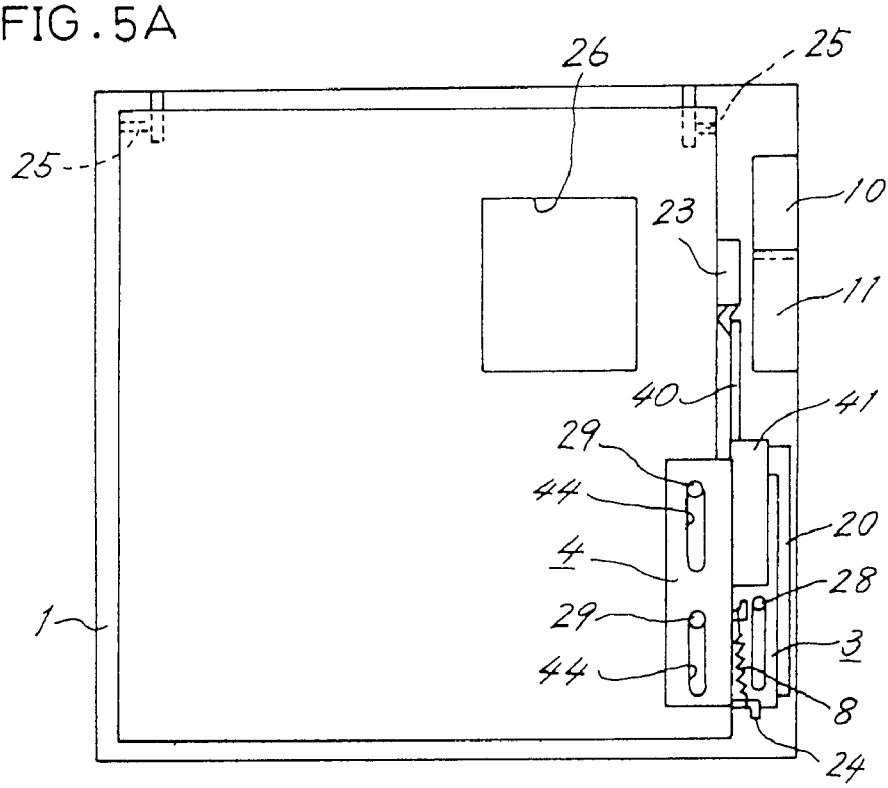
FIG. 5A, FIG. 5B are views corresponding respectively to FIG. 4A, FIG. 4B as the holder is seen from the direction A.
Figure 5B:
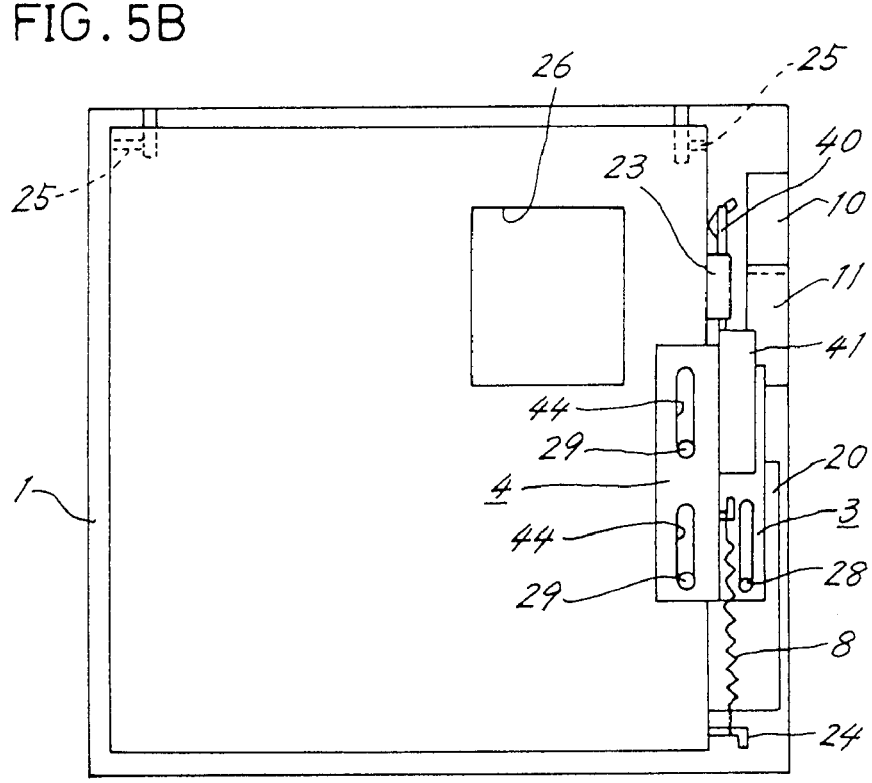

FIG. 4A and FIG. 4B are side elevations of the holder 2 in a raised position, FIG. 4A showing the holder ready for the loading of the cartridge 60, FIG. 4B showing the cartridge 60 as loaded completely. FIG. 5A and FIG. 5B are views corresponding respectively to FIG. 4A and FIG. 4B as the holder is seen from the direction A. As seen in FIG. 4A and FIG. 5A, the slope 43 of the engaging hook 40 is positioned to the rear of the lug 23 before the cartridge 60 is loaded. The latch 30 is positioned in the rear of the hole 22 of the holder 2 and is warped outward by contact with the side wall of the holder 2. Further as shown in FIG. 5A, the engaging hook 40 is positioned inwardly of the change-over piece 10, which will not interfere with the movement of the lock slide 4.

The operations of loading the cartridge, lowering the holder, raising the holder and unloading the cartridge will be described below as divided in this way.

Loading the Cartridge, see FIGS. 4A–7B

FIGS. 6A, 6B, 7A and 7B are plan views of the holder 2 in section. For the convenience of illustration, the lock slide 4 and the tension spring 8 are not shown in FIGS. 6A to 7B.

Figure 6A:
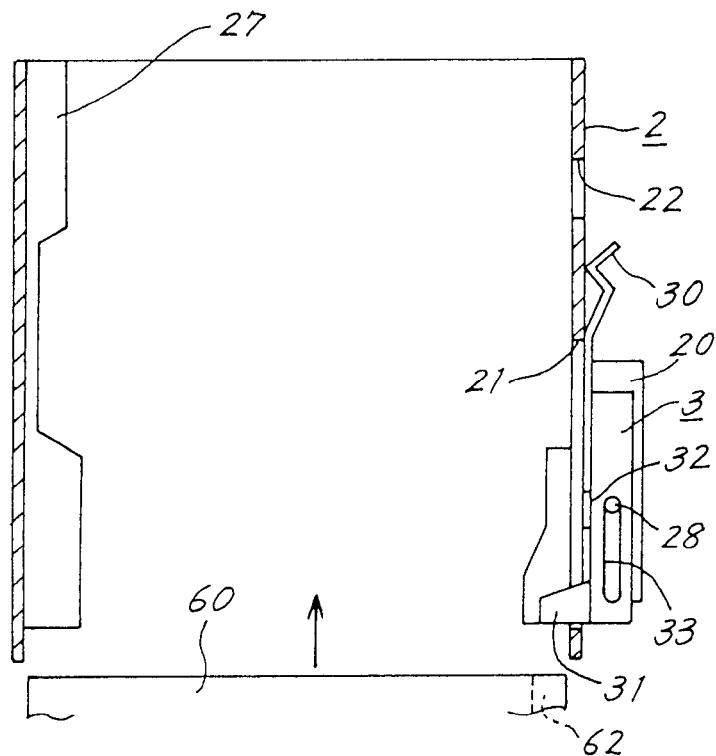
FIG. 6A, FIG. 6B are plan views of the holder in section, FIG. 6A showing the holder ready for the loading of the cartridge thereinto, FIG. 6B showing the cartridge while it is being loaded.
Figure 6B:
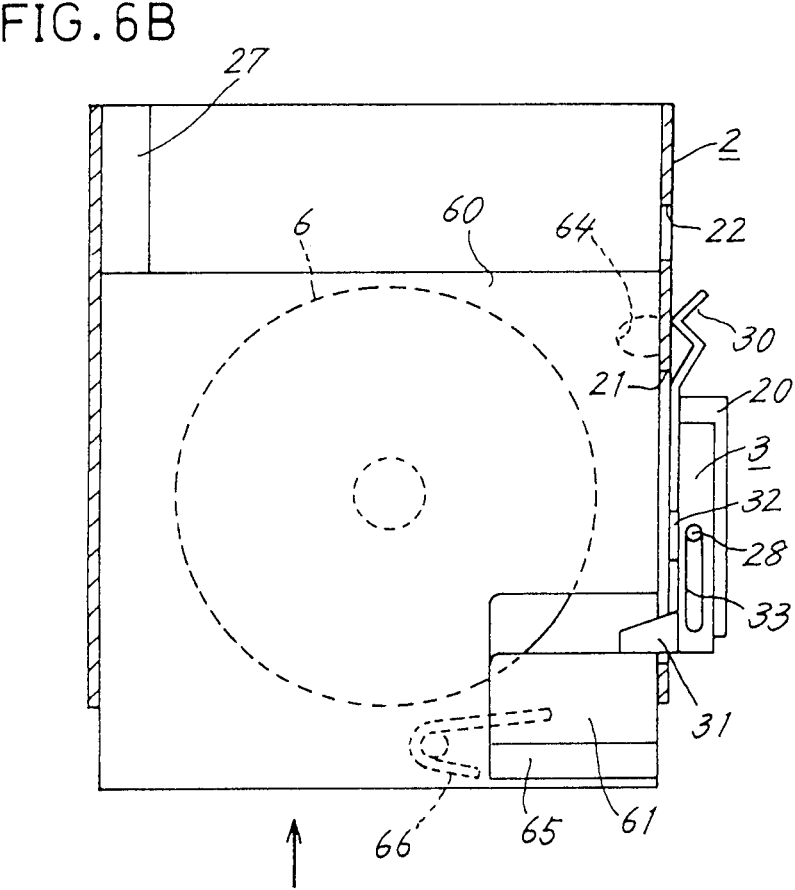

When the cartridge 60 is inserted into the holder 2 in the state shown in FIG. 6A, the opening piece 31 of the slide member 3 fits into the groove 62 of the cartridge 60 and comes into contact with the shutter 61. Since the force of the tension spring 8 biasing the slide member 3 rearward is greater than the force of the torsion spring 66 of the cartridge 60, the slide member 3 remains unmoved even if the cartridge 60 is pushed as shown in FIG. 6B. The shutter 61 is opened against the torsion spring 66.

Figure 7A:
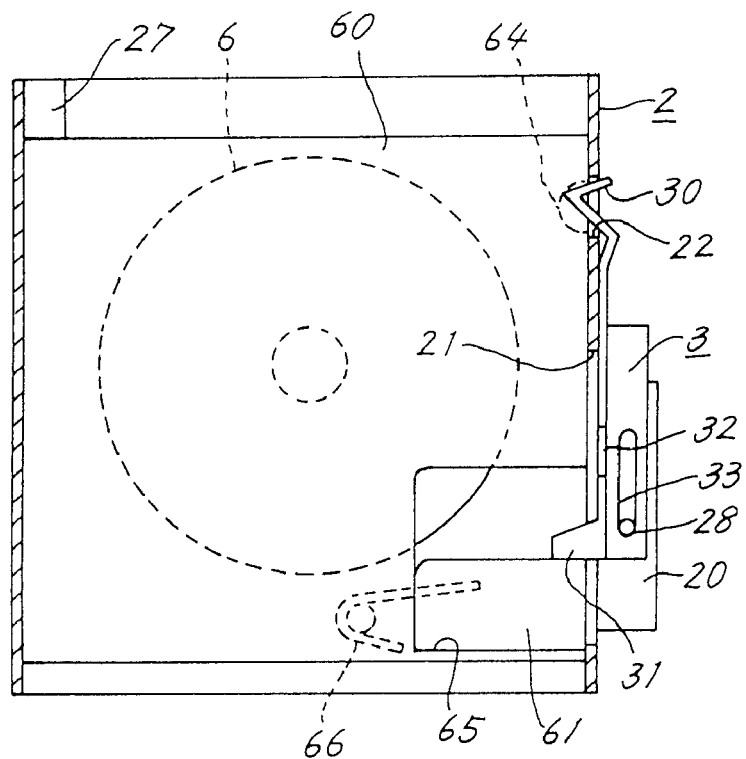
FIG. 7 includes plan views in section, FIG. 7A showing the cartridge as completely loaded in place.
FIG. 7B showing a latch as released.
Figure 7B:
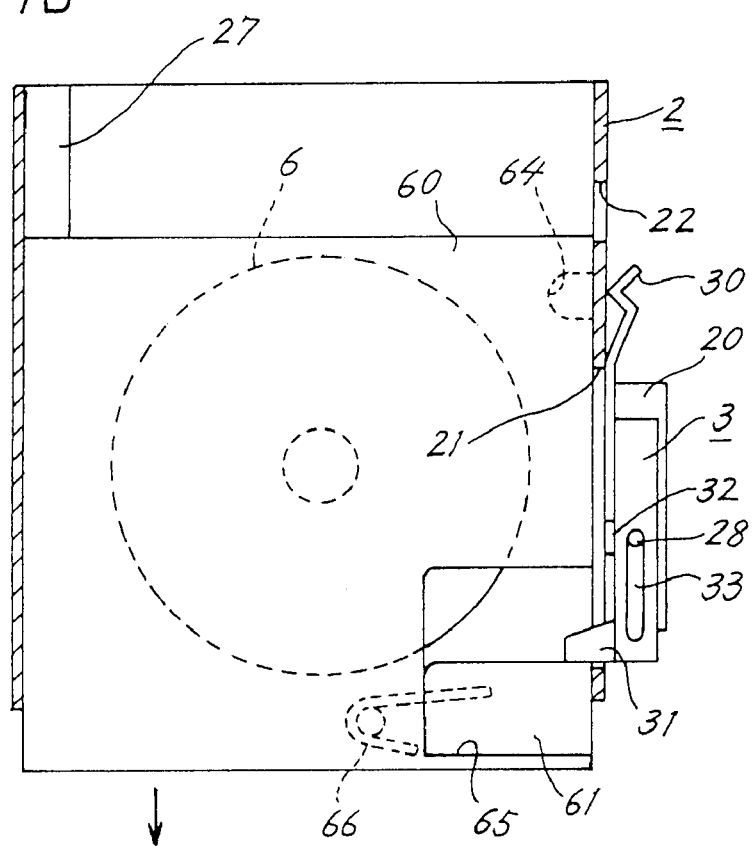

When the shutter 61 is completely opened, the shutter 61 comes into contact with the rear edge of the recessed portion 65 as seen in FIG. 7B. The latch 30 does not reach the hole 22 because the slide member 3 remains unmoved. This state will be referred to as a first position.

The cartridge 60 is further pushed in from the first position. Because the shutter 61 is unable to further open, the shutter 61 pushes the opening piece 31 of he slide member 3. The slide member 3 advances, causing the latch 30 to fit into the hole 22 of the holder 2. The latch 30 extending through the hole 22 lightly engages in the caved portion 64 of the cartridge 60. The cartridge 60 is held in a completely loaded state.

On the other hand, with the projection 32 of the slide member 3 in contact with the spring retainer 42 of the lock slide 4 as shown in FIGS. 2, 4A, 4B, the lock slide 5 advances against the tension spring 8 when the slide member 3 is pushed. The slope 43 of the engaging hook 40 comes into contact with the lug 23 of the holder 2 from the state shown in FIG. 4A, whereby the hook 40 is deformed by deflection. Upon the slope 43 moving past the lug 23, the hook 40 elastically restores itself to become engaged with the lug 23 as seen in FIG. 4B.

The lock slide 4 is restrained from moving in the cartridge unloading direction, and the cartridge 60 is held in engagement with the latch 30. With the latch 30 fitting in the hole 22 of the holder 2, the slide member 3 will not move inadvertently in the direction in which the cartridge is unloaded from the holder 2. This state will be referred to as a second position.

When the lock slide 4 advances and becomes engaged with the holder 2 as stated above, the amount of movement of the lock slide 4 at this time is smaller than the amount of movement of the lock slide 4 from the start of loading of the cartridge 60 until the completion of loading.

As shown in FIG. 5B, the push plate 41 of the lock slide 4 is positioned over the change-over piece 10.

Lowering the Holder

Figure 8A:
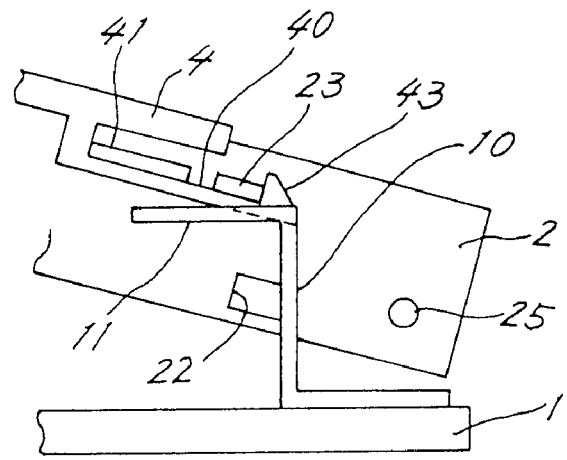
FIG. 8A, FIG. 8B, FIG. 8C are enlarged side elevations showing engagement between a change-over piece and an engaging hook.
Figure 8B:
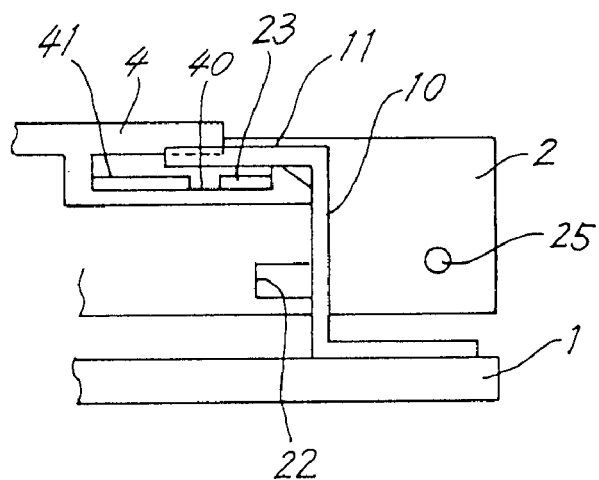
Figure 8C:
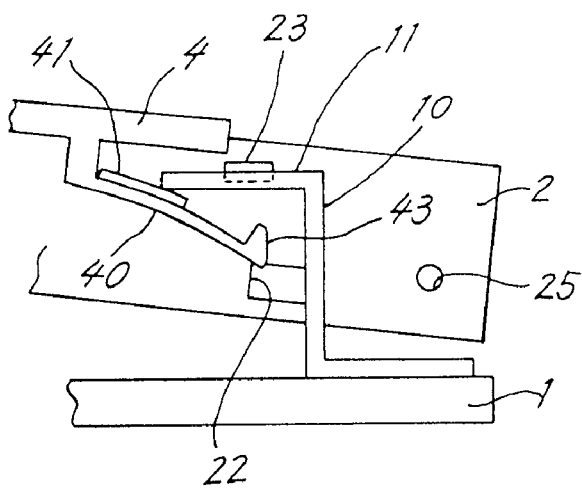

For recording or playback, the holder 2 is lowered with the cartridge loaded completely. FIGS. 8A, 8B, 8C are enlarged side elevations of the change-over piece 10 and the engaging hook 40. When the holder 2 is lowered from the completely loaded state shown in FIG. 8A, the push plate 41 of the lock slide 4 comes into contact with the upper plate 11 of the change-over piece 10. Since the upper plate 11 has high rigidity than the engaging hook 40 provided with the push plate 41, the hook 40 is biased upward, whereas the hook 40 is prevented from deflecting and deforming upward by contact with the lug 23. Accordingly, the holder 2 lowers with the lock slide 4 conversely deflecting the change-over piece 10 for deformation. Upon completion of descent of the holder 2, the engaging hook 40 moves past the upper plate 11, permitting the upper plate 11 to elastically restore itself (see FIG. 8B).

With the holder 2 in the completely lowered state, the pickup 72 (see FIG. 1) moves for the playback of the disk 6. Alternatively, the head lever 7 is lowered into contact with the disk 6 by the lift mechanism to record signals.

Raising the Holder and Unloading the Cartridge

When the user is to remove the cartridge 60 from the holder 2 after the completion of recording or playback, the holder 2 is pivotally moved upward. The present invention is characterized by the unloading movement of the cartridge at this time.

When the holder 2 is raised pivotally, the push plate 41 of the lock slide 4 comes into contact with the upper plate 11 of the change-over piece 10 as shown in FIG. 8C. The upper plate 11, which has higher rigidity than the engaging hook 40 provided with the push plate 41, deflects the hook 40 downward for deformation as seen in FIG. 8C. The hook 40 is released from the lug 23, and the lock slide 4 is moved from the state shown in FIG. 4B toward the cartridge unloading direction by the tension spring 8.

The spring retainer 42 of the lock slide 4 pushes the projection 32 of the slide member 3, moving the latch 30 out of the state shown in FIG. 7A, i.e., from light engagement with the caved portion 64 of the cartridge 60. The slide member 3 moves toward the cartridge unloading direction, pushing the open shutter 61 as shown in FIG. 7B to push the cartridge 60 toward the unloading direction. The force of the tension spring 8 is utilized when the greatest force is required for stating the unloading of the cartridge 60. The movement of the slide member 3 is restricted by the contact of the front end of the slit portion 33 with the pin 28.

While the slide member 3 pushes the shutter 61 to move the cartridge 60 as described above, the amount of movement of the slide member 3 is smaller than the amount of movement of the cartridge 60 from the start of loading until the completion of loading, so that the cartridge in the above state will not be fully unloaded. Accordingly, the cartridge 60 is subsequently unloaded in the following manner.

When the latch 30 is brought out of light engagement with the caved portion 64 as shown in FIG. 7A, the opening piece 31 is pushing the shutter 61 open. However, the shutter 61 is biased toward the closing direction by the spring 66 disposed inside the cartridge 60, and the side end of the shutter 61 toward the closing direction is in contact with the opening piece 31. The contact of the shutter 61 with the opening piece 31 causes the force of the spring to act in the cartridge unloading direction, while the cartridge 60 is allowed to move toward the unloading direction, with the result that the cartridge 60 is unloaded from the holder 2 as seen in FIG. 6A. The shutter 61 is reliably closed by the spring 66 upon unloading.

Figure 11A:
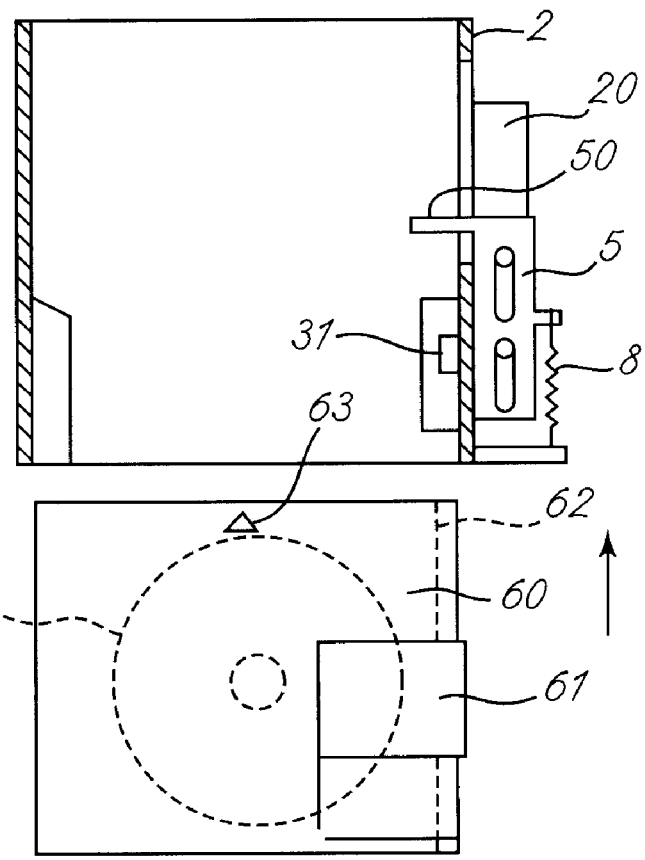
FIG. 11A, FIG. 11B are sectional views showing the holder of FIG. 10 as it is seen from the direction B, FIG. 11A showing the holder ready for the loading of the cartridge, FIG. 11B showing the cartridge as loaded completely.
Figure 11B:
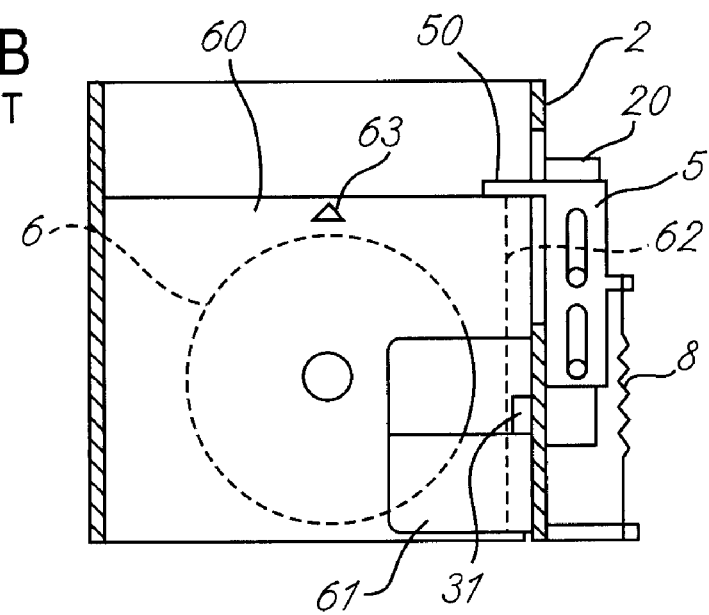

Stated more specifically, the present embodiment is characterized in that when to be unloaded, the cartridge 60 is disengaged from the slide member 3 so as to be movable in the unloading direction and is moved in the unloading direction by the spring 66 inside the cartridge 60. There is no need to provide the contact piece 50 (see FIG. 11) used conventionally for pushing the end face of the cartridge 60 to provide a simplified arrangement for unloading the cartridge 60.

Figure 12:
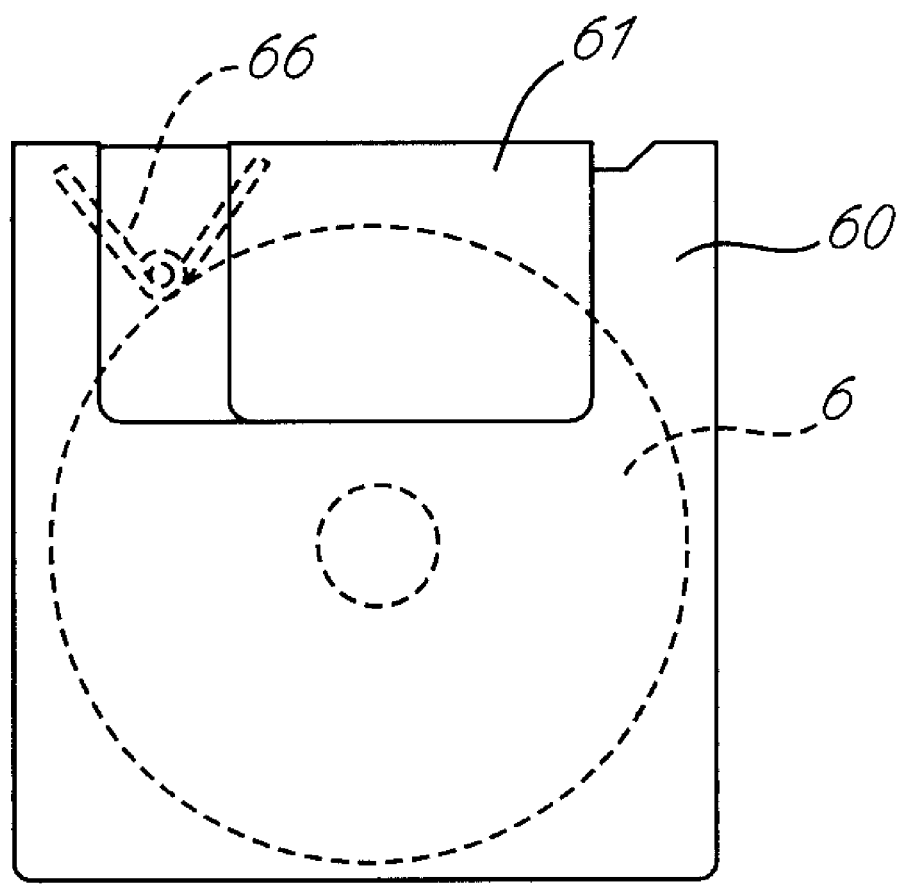
FIG. 12 is a plan view of another conventional cartridge.

Incidentally, FIG. 12 shows a known cartridge 60 wherein the shutter 61 thereof is biased by a spring in the closing direction. This relates to so-called floppy disks. The shutter 61 is slidable in a direction orthogonal to the cartridge loading direction.

Figure 9:
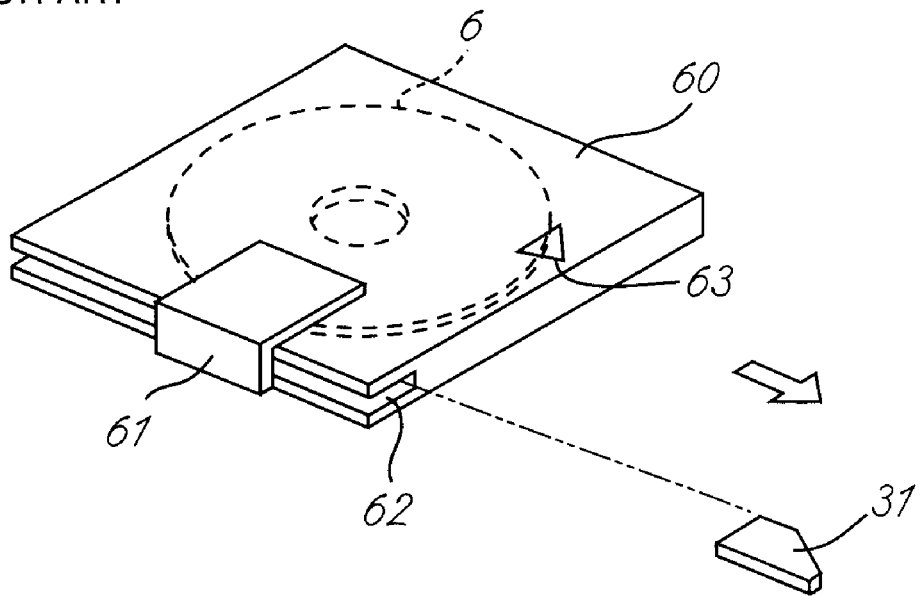
FIG. 9 is a perspective view of a conventional cartridge.
Figure 10:
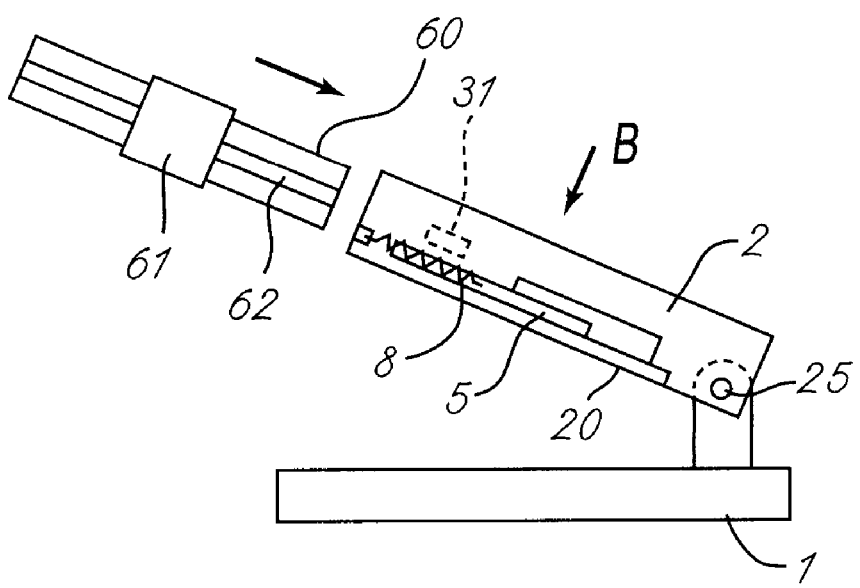
FIG. 10 is a side elevation of the cartridge and a holder of the prior art.

The present applicant modified the cartridges 60 of FIGS. 9 and 12, contrived the cartridge 60 shown in FIG. 3 wherein the shutter 61 movable in the cartridge loading direction is biased toward the closing direction by a spring, and has provided a simplified mechanism for unloading the cartridge from the holder 2 using this cartridge 60.

Further with the recording or playback device of the present embodiment, the shutter 61 is opened in the first position when the cartridge 60 is loaded into the holder 2, and the slide member 3 engages with the cartridge 60 in the second position. With the conventional device shown in FIGS. 11, the opening piece 31 completely opens the shutter 61 approximately simultaneously with the engagement of the kickout member 5 with the holder 2, so that if the opening piece 31 and the kickout member 5 are not positioned properly relative to each other for one cause or another, it is likely that the cartridge 60 will be completely loaded before the shutter 61 is completely opened.

With the device embodying the invention, however, the slide member 3 further advances into engagement with the cartridge 60, with the shutter 61 completely opened. Thus, the slide member 3 comes into engagement with the cartridge 60, with the shutter 61 reliably opened. Accordingly there is no likelihood that the cartridge 60 will be completely loaded without completely opening the shutter 61.

The latch 30 is disengaged from the cartridge 60 by the movement of the lock slide 4 according to the present invention, whereas a plunger (not shown) may alternatively be provided on the chassis 1, as coupled to the latch 30 for selectively engaging the latch 30 with the cartridge 60 or disengaging the latch therefrom.

INDUSTRIAL APPLICABILITY

The movements of components of the device of the invention will be described below.

For Loading

When the cartridge 60 is inserted into the holder 2, the opening piece 31 opens the shutter 61. When the cartridge 60 is further inserted into the holder 2, the latch 30 engages the cartridge 60, holding the cartridge 60 in the holder 2. The opening piece 31 remains in contact with the shutter 61.

For Unloading

When the cartridge 60 is to be unloaded from the holder 2, the latch 30 is first disengaged from the cartridge 60, rendering the cartridge 60 free to move in the direction of unloading from the holder 2. The shutter 61 as opened in contact with the opening piece 31 is biased by the spring 66 toward the closing direction, and the cartridge 60 is moved toward the direction of unloading from the holder 2 by the biasing force of the spring.

Thus, the biasing force of the spring 66 inside the cartridge 60 is used for unloading the cartridge 60 from the holder 2 according to the present invention. The arrangement for unloading the cartridge is simplified by obviating the need to provide the separate member conventionally used for kicking out the cartridge 60 in the unloading direction.

Because the shutter 61 is automatically closed by the spring 66 when the cartridge 60 is unloaded from the holder 2, there is no likelihood that the shutter 61 will open inadvertently.

What is claimed is:

1. A disk recording or playback device comprising a holder provided on a chassis for supporting a cartridge having an openable shutter, and an opening piece disposed at one side of a path of movement of the cartridge within the holder for opening the shutter when the cartridge is loaded into the holder to expose a signal bearing surface of a disk accommodated in the cartridge, wherein the opening piece is provided on a slide member disposed on the holder and movable in directions of loading and unloading the cartridge, the slide member being provided with a latch for engaging the cartridge in a position where the cartridge is completely loaded into the holder, wherein the slide member is reciprocatingly movable between a first position where the opening piece pushes the shutter open with the loading of the cartridge into the holder and a second position where the latch engages the cartridge after moving from the first position toward the cartridge loading direction, wherein a release mechanism is disposed between the chassis and the holder for disengaging the latch from the cartridge when the cartridge is unloaded from the holder, and wherein the holder is provided on the chassis upwardly and downwardly movably, and the release mechanism comprises a lock slide positioned on the holder and operatively connected to the slide member to engage with the holder with the loading of the cartridge into the holder in a raised position, and a change-over piece positioned on the chassis to permit passage of the lock slide when the holder is lowered and to disengage the lock slide from the holder when the holder is raised.

* * * * *